(12) United States Patent
Kwon

(10) Patent No.: US 9,865,888 B2
(45) Date of Patent: Jan. 9, 2018

(54) SYSTEM AND METHOD FOR CONTROLLING TEMPERATURE OF FUEL CELL STACK

(71) Applicant: Hyundai Motor Company, Seoul (KR)

(72) Inventor: Sang Uk Kwon, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 113 days.

(21) Appl. No.: 14/639,804

(22) Filed: Mar. 5, 2015

(65) Prior Publication Data

US 2016/0126565 A1 May 5, 2016

(30) Foreign Application Priority Data

Nov. 5, 2014 (KR) .......................... 10-2014-0152517

(51) Int. Cl.
| | |
|---|---|
| *H01M 8/04* | (2016.01) |
| *H01M 8/04029* | (2016.01) |
| *H01M 8/04746* | (2016.01) |
| *H01M 8/0432* | (2016.01) |
| *H01M 16/00* | (2006.01) |
| *H01M 8/04701* | (2016.01) |

(52) U.S. Cl.
CPC ..... *H01M 8/04029* (2013.01); *H01M 8/0435* (2013.01); *H01M 8/04358* (2013.01); *H01M 8/04731* (2013.01); *H01M 8/04768* (2013.01); *H01M 16/006* (2013.01); *H01M 2250/20* (2013.01); *Y02T 90/32* (2013.01)

(58) Field of Classification Search
CPC ......... H01M 8/04029; H01M 8/04768; H01M 8/04358; H01M 16/006; H01M 8/0435; H01M 8/04731; H01M 2250/20; Y02T 90/32
See application file for complete search history.

(56) References Cited

U.S. PATENT DOCUMENTS

2015/0056530 A1* 2/2015 Nishikawa .............. B60L 1/003
429/437

FOREIGN PATENT DOCUMENTS

| | | |
|---|---|---|
| JP | 2004-152666 A | 5/2004 |
| JP | 2004-328914 | 11/2004 |
| JP | 2004-355912 | 12/2004 |
| JP | 2009-140696 | 6/2009 |
| KR | 10-2011-0138443 A | 12/2011 |

(Continued)

*Primary Examiner* — Mark F Huff
*Assistant Examiner* — Monique Wills
(74) *Attorney, Agent, or Firm* — Mintz Levin Cohn Ferris Glovsky and Popeo, P.C.; Peter F. Corless

(57) ABSTRACT

A system and method for controlling a temperature of a fuel cell stack are provided. The method includes performing a pump OFF mode which turns off the cooling water pump or operates the cooling water pump while reducing the rotation speed of the cooling water pump to be less than the reference rotation speed, when a cooling water outlet temperature is equal to or less than a preset first temperature while a pump normal mode which adjusts a rotation speed of a cooling water pump to be equal to or greater than a preset reference rotation speed and varies rpm based on the cooling water outlet temperature is performed. In addition, the pump normal mode is performed when a cooling water outlet temperature estimation value of the fuel cell stack exceeds a preset second temperature while the pump OFF mode is performed.

17 Claims, 5 Drawing Sheets

(56) References Cited

FOREIGN PATENT DOCUMENTS

KR  10-2012-0053137 A  5/2012
KR  10-2014-0078948 A  6/2014

* cited by examiner

<CURRENT VS VOLTAGE/OUTPUT OF FUEL CELL>

SYSTEM AND METHOD FOR CONTROLLING TEMPERATURE OF FUEL CELL STACK

CROSS-REFERENCE(S) TO RELATED APPLICATIONS

The present application claims priority of Korean Patent Application Number 10-2014-0152517 filed on Nov. 5, 2014, the entire contents of which application are incorporated herein for all purposes by this reference.

BACKGROUND

Field of the Invention

The present invention relates to a system and method for controlling a temperature of a fuel cell stack, and more particularly, to a method for controlling a temperature of a fuel cell stack by adjusting a voltage of a cooling pump and a power converter.

Description of Related Art

A fuel cell vehicle includes a fuel cell stack in which a plurality of fuel cells used as a power source are stacked, a fuel supplying system that supplies hydrogen, or the like, which is fuel, to the fuel cell stack, an air supplying system that supplies oxygen, which is an oxidizing agent required for an electrochemical reaction, a water and heat management system that adjusts a temperature of the fuel cell stack, and the like. The fuel supplying system reduces a pressure of compressed hydrogen in a hydrogen tank and supplies the compressed hydrogen to an anode of the fuel cell stack, and the air supplying system supplies external air suctioned by operating an air blower to a cathode of the fuel cell stack.

When hydrogen is supplied to the anode of the fuel cell stack and oxygen is supplied to the cathode of the fuel cell stack, hydrogen ions are separated by a catalytic reaction in the anode. The separated hydrogen ions are transferred to an oxidizing electrode, which is the cathode, through an electrolyte membrane, and the hydrogen ions separated in the anode generates an electrochemical reaction together with electrons and the oxygen in the oxidizing electrode, such that electric energy may be obtained. In particular, electrochemical oxidization of the hydrogen is generated in the anode, and electrochemical reduction of the oxygen is generated in the cathode. Further, electricity and heat are generated due to movement of electrons generated by the above-mentioned process, and water vapor or water is generated by a chemical bonding of the hydrogen with the oxygen.

Additionally, to discharge hydrogen, oxygen, and the like that do not react to byproducts such as water vapor, water, and heat generated in an electric energy generating process of the fuel cell stack, a discharge apparatus is provided, and gases such as water vapor, hydrogen, and oxygen are discharged into the atmosphere through a discharge path. Components such as an air blower, a hydrogen recirculation blower, and a water pump for operating the fuel cell are connected to a main bus terminal to facilitate a start-up of the fuel cell, in which the main bus terminal may be connected to various types of relays which facilitate cutting off and connection of power and a diode which prevents a reverse current from flowing in the fuel cell.

A fuel cell system used in a hydrogen fuel cell vehicle which is one of the environmentally-friendly vehicles is configured to include a fuel cell stack that generates electric energy from an electrochemical reaction of reaction gas, a hydrogen supplying apparatus that supplies hydrogen, which is fuel, to the fuel cell stack, an air supplying apparatus that supplies air including oxygen, which is an oxidizing agent required for an electrochemical reaction, to the fuel cell stack, a heat and water management system that optimally adjusts an operation temperature of the fuel cell stack by discharging heat, which is electrochemical reaction byproducts of the fuel cell stack, to the exterior and performs a water management function, and a fuel cell system controller that operates the fuel cell system.

By the configuration, the fuel cell stack generates electric energy from the electrochemical reaction of hydrogen and oxygen which are reaction gas and discharges heat and water which are the reaction byproducts. Therefore, the fuel cell system essentially includes an apparatus for cooling a fuel cell stack to prevent the temperature of the fuel cell stack from increasing. In particular, a polymer electrolyte membrane fuel cell (PEMFC) has merits of a rapid start-up time and a rapid power conversion reaction time due to a low operation temperature while having a high power density; however, the PEMFC requires water and therefore needs to be operated at a temperature of about 100° C. or less.

Generally, a cooling system for maintaining the fuel cell stack at an optimal temperature in the fuel cell system for a vehicle has widely adopted a water cooling type which cools the fuel cell stack by circulating water through a cooling water channel in the fuel cell stack.

A temperature control system of the fuel cell system is illustrated in FIG. 1. As illustrated in FIG. 1, the temperature control system of the fuel cell system includes a radiator 60 and a cooling fan 21 that discharges heat from cooling water to the exterior, a cooling water line 31 disposed between a fuel cell stack 10 and the radiator 60 to circulate the cooling water, a bypass line 32 and a 3-way valve 33 for bypassing the cooling water to prevent the cooling water from passing through the radiator 60, and a cooling water pump 70 for pumping the cooling water and delivering the pumped cooling water through the cooling water line 31. Particularly, the bypass line 32 is a cooling water line which does not pass through the radiator 60 by being branched from the cooling water line at upstream and downstream sides of the radiator to bypass cooling water and the 3-way valve 40 serves to selectively adjust a flow of cooling water between a main line and the bypass line 32 which does not pass through the radiator.

Meanwhile, the fuel cell stack has both of a flooding phenomenon wherein water floods and a dry-out phenomenon wherein water is supplied in insufficient amounts. To improve the phenomena, the temperature of the fuel cell stack needs to be maintained within a normal range (e.g., in which the water does not overflow or dry out). In other words, a need exists for a method for preventing the flooding phenomenon and the dry-out phenomenon by adjusting the temperature of the fuel cell stack while minimizing power consumption by optimizing the operation of the cooling water pump and the cooling fan.

SUMMARY

An exemplary embodiment of the present invention is directed to a system and method for adjusting a temperature of a fuel cell stack, and an object of the present invention is to provide a method for adjusting a temperature of a fuel cell stack by adjusting a voltage of a cooling pump and a power converter. Other objects and advantages of the present invention can be understood by the following description, and become apparent with reference to the exemplary embodiments of the present invention. Additionally, it is obvious to those skilled in the art to which the present invention pertains that the objects and advantages of the present invention can be realized by the means as claimed and combinations thereof.

In accordance with an exemplary embodiment of the present invention, a method for adjusting a temperature of a fuel cell stack may include: performing a pump OFF mode which turns off the cooling water pump or operates the cooling water pump while reducing the rotation speed of the cooling water pump to be less than the reference rotation speed, when a cooling water outlet temperature is equal to or less than a preset first temperature while a pump normal mode which adjusts a rotation speed of a cooling water pump to be equal to or greater than a preset reference rotation speed and varies revolutions per minute (rpm) based on the cooling water outlet temperature is performed; and performing the pump normal mode when a cooling water outlet temperature estimation value of the fuel cell stack exceeds a preset second temperature while the pump OFF mode is performed.

In the first process, the pump OFF mode may be performed when the cooling water outlet temperature is equal to or less than the preset first temperature and a heating value of the fuel cell stack is equal to or less than a preset first reference heating value and in the second process, the pump normal mode may be performed when the cooling water outlet temperature estimation value exceeds the preset second temperature or the heating value of the fuel cell stack exceeds a preset second reference heating value. Further, the pump OFF mode may be performed when the cooling water outlet temperature is equal to or less than the preset first temperature and an air outlet temperature of the fuel cell stack is less than a first air outlet temperature and the pump normal mode may be performed when the cooling water outlet temperature estimation value exceeds the preset second temperature or the air outlet temperature of the fuel cell stack exceeds a preset second air outlet temperature.

The pump OFF mode may also be performed when the cooling water outlet temperature is equal to or less than the preset first temperature and a torque value required in a motor connected to the fuel cell stack is less than a preset first required torque is maintained for a preset first time. The pump normal mode may be performed when the cooling water outlet temperature estimation value exceeds the preset second temperature or the torque value required in a motor connected to the fuel cell stack exceeds a preset second required torque. Additionally, the pump normal mode may be performed when the greater value of the cooling water outlet temperature estimation value of the fuel cell stack and the cooling water outlet temperature detected by a temperature sensor exceeds the preset second temperature.

The preset first temperature and the preset second temperature may be equal to or less than a target cooling water temperature at a cooling water inlet side. During the pump OFF mode, an output limit value of the fuel cell stack may be set using the cooling water outlet temperature estimation value. When the pump OFF mode is performed, an output limit value of the fuel cell stack may be set based on a non-circulation of cooling water. The cooling water outlet temperature estimation value of the fuel cell stack may be initialized to the detected cooling water temperature before the pump OFF mode is performed.

In accordance with another exemplary embodiment of the present invention, a method for controlling a temperature of a fuel cell stack may include: performing a low output avoidance mode which allows a power converter to reduce a voltage upper bound of a bus terminal, when a cooling water outlet temperature calculation value is equal to or less than a preset third temperature while an output normal mode in which the voltage upper bound of the bus terminal between an output terminal of the fuel cell stack and the power converter has a predetermined value is performed; and performing the output normal mode when the cooling water outlet temperature calculation value is equal to or greater than a preset fourth temperature while the low output avoidance mode is performed. The cooling water outlet temperature calculation value is a cooling water temperature estimation value in a pump OFF mode which may turn off a cooling water pump or operate the cooling water pump while reducing a rotation speed of the cooling water pump to be less than a preset reference rotation speed and may be a sensing value of the cooling water outlet temperature in a pump normal mode which may adjust the rotation speed of the cooling water pump to be equal to or greater than the preset reference rotation speed and vary a rpm based on the cooling water outlet temperature.

The preset third temperature and the preset fourth temperature may be equal to or less than a target cooling water temperature at a cooling water inlet side. In the low output avoidance mode, a charging current limit value of the power converter or a target state of charge of the high voltage battery may be increased and in the output normal mode, the increase in the charging current limit value of the power converter or the target state of charge of the high voltage battery may be released. The reduction in the voltage upper bound of the bus terminal and the increase in the charging current limit value may be performed within a range of an allowable charging output or an allowable state of charge of the high voltage battery. The low output avoidance mode may be not performed in the state in which power generation of the fuel cell stack stops. The low output avoidance mode may not be performed in a regenerative braking state.

In accordance with still another exemplary embodiment of the present invention, a method for controlling a temperature of a fuel cell stack, may include: performing a pump OFF mode which may turn off the cooling water pump or operate the cooling water pump while reducing the rotation speed of the cooling water pump to be less than the reference rotation speed, when a cooling water outlet temperature is equal to or less than a preset first temperature while a pump normal mode which may adjust a rotation speed of a cooling water pump to be equal to or greater than a preset reference rotation speed and vary rpm based on the cooling water temperature is performed; and performing a low output avoidance mode which allows a power converter to reduce a voltage upper bound of a bus terminal, when a cooling water temperature calculation value is equal to or less than a preset third temperature while an output normal mode in which the voltage upper bound of the bus terminal between an output terminal of the fuel cell stack and the power converter has a predetermined value is performed, wherein the first temperature may be equal to or greater than the third temperature.

In accordance with still yet another exemplary embodiment of the present invention, a method for controlling a temperature of a fuel cell stack may include: performing a pump OFF mode which may turn off a cooling water pump or operate the cooling water pump while reducing a rotation speed of the cooling water pump to be less than a preset reference rotation speed, when a heating value of the fuel cell stack is equal to or less than a preset first reference heating value while a pump normal mode which may adjust a rotation speed of the cooling water pump to be equal to or greater than a preset reference rotation speed and vary rpm based on the cooling water temperature is performed; and performing a low output avoidance mode which allows a power converter to reduce a voltage upper bound of a bus terminal, when a cooling water temperature at a cooling water outlet side detected by a temperature sensor is equal to or less than a preset third temperature while an output normal mode in which the voltage upper bound of the bus terminal between an output terminal of the fuel cell stack and the power converter has a predetermined value is performed. When the heating value of the fuel cell stack exceeds a preset second reference heating value, the pump normal mode may not be performed.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
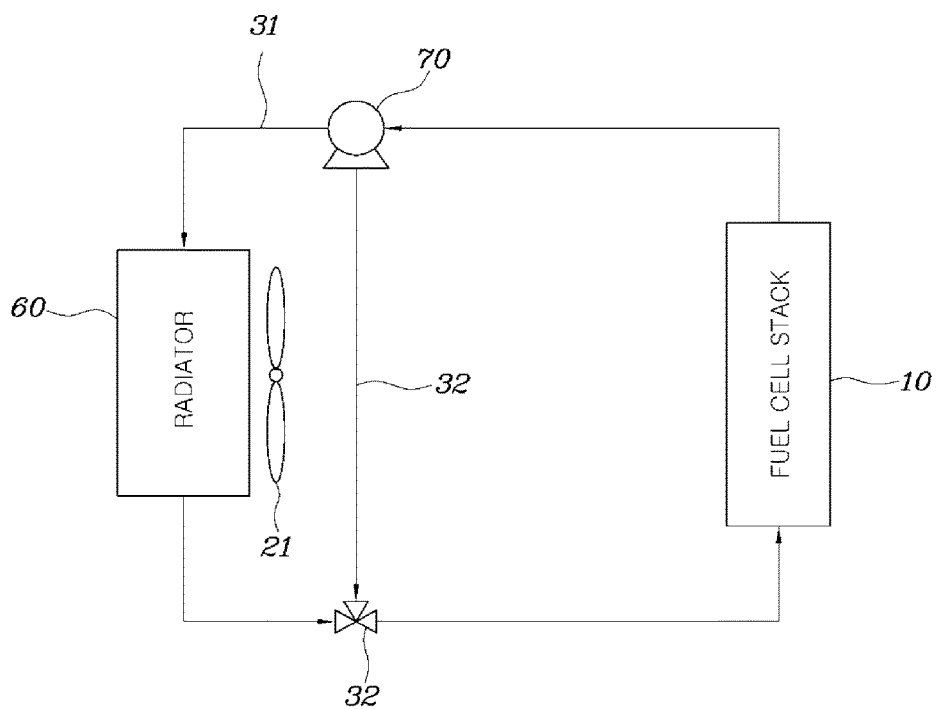
FIG. 1 is an exemplary configuration diagram illustrating a temperature control system of a fuel cell system according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions will be provided to describe various exemplary embodiments of the present invention disclosed in the present specification or disclosure. Therefore, exemplary embodiments of the present invention may be implemented in various forms, and the present invention is not to be interpreted as being limited to exemplary embodiments described in the present specification or disclosure.

Since exemplary embodiments of the present invention may be various modified and may have several forms, specific exemplary embodiments will be shown in the accompanying drawings and will be described in detail in the present specification or disclosure. However, it is to be understood that the present invention is not limited to specific exemplary embodiments, but includes all modifications, equivalents, and substitutions included in the spirit and the scope of the present invention.

Terms such as 'first', and/or 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention.

It is to be understood that when one component is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", or "neighboring to", "directly neighboring to" and the like, should be similarly interpreted.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly indicates otherwise.

Hereinafter, exemplary embodiments of the present invention will be described in detail with reference to the accompanying drawings. Like reference numerals proposed in each drawing denote like components.

Figure 2:
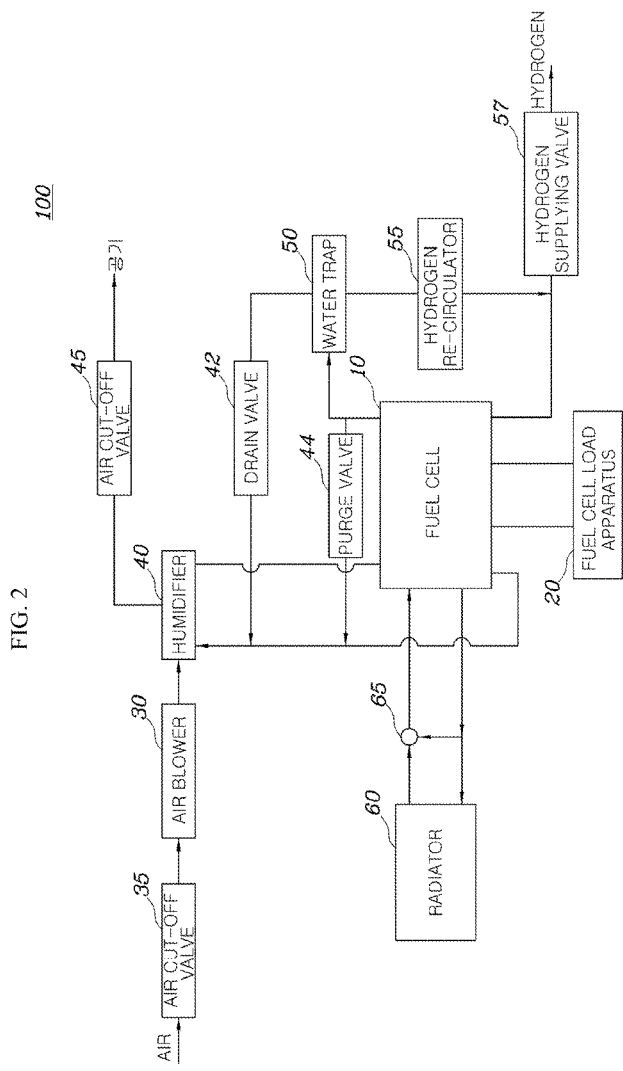
FIG. 2 is an exemplary diagram illustrating an overall fuel cell system according to an exemplary embodiment of the present invention.

FIG. 2 is an exemplary diagram illustrating an overall fuel cell system according to an exemplary embodiment of the present invention. As illustrated in FIG. 2, the fuel cell system 100 may include a fuel cell stack 10, a warm-up of the fuel cell stack 10, a fuel cell load apparatus 20 configured to prevent a voltage of the fuel cell stack 10 from being increased during start-up and shut-down, an air blower 30, a humidifier 40, air cut-off valves 35 and 45 at an inlet side and an outlet side, a drain valve 42, a purge valve 44 configured to discharge and purge hydrogen from an anode to remove foreign materials such as droplet and nitrogen from a bipolar plate in the fuel cell stack 10 and increase hydrogen utilization, a water trap 50, a hydrogen re-circulator 55 configured to recirculate non-reaction hydrogen remaining after the hydrogen is used in the anode of the fuel cell stack 10 to the anode to promote the reuse of the hydrogen, a hydrogen supplying valve 57, a radiator 60, and a thermostat 65.

Although not illustrated in FIG. 1, a controller may be configured to operate an opening and closing of various kinds of types and measure a heating value of the fuel cell stack 10 and may be configured to receive detection values of a temperature sensor, a voltage and current sensor, and the like to operate each component of the fuel cell system.

Figure 3:
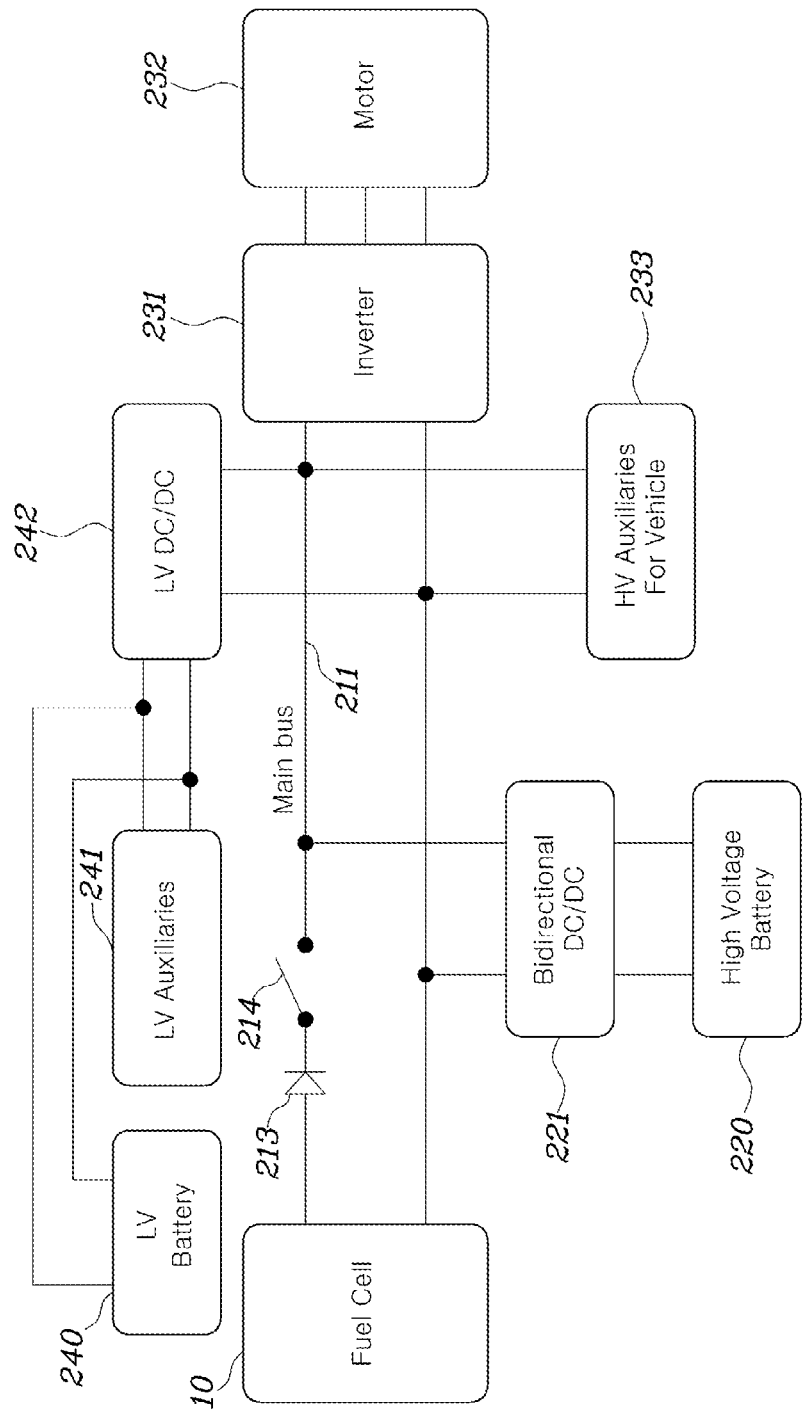
FIG. 3 is an exemplary configuration diagram of a power network of the fuel cell system according to the exemplary embodiment of the present invention.

FIG. 3 is an exemplary configuration diagram of a power network of the fuel cell system according to the exemplary embodiment of the present invention. As illustrated in FIG. 3, a fuel cell-battery hybrid electric system for a vehicle may include the fuel cell 10 which is a main power source and a high voltage battery (main battery) 220 which is an auxiliary power source which may be connected to each other in parallel via a main bus terminal 211, a bidirectional high voltage direct current-direct current DC/DC) converter 221 connected to the high voltage battery 220 to adjust an output of the high voltage battery 220, an inverter 231 connected to the fuel cell 10 and the main bus terminal 211 which is an output side of the high voltage battery 220, a driving motor 232 connected to the inverter 231, a high voltage load 233, a low voltage battery (auxiliary battery) 240, and a low voltage load 241 in a vehicle other than the inverter 231 and the driving motor 232, a low voltage DC/DC converter 242 connected between the low voltage battery 240 and the main bus terminal 211 to convert a high voltage into a low voltage, and a fuel cell load apparatus 20.

In this configuration, the fuel cell stack 10 used as the main power source of the vehicle and the high voltage battery 220 used as the auxiliary power source may be connected to each load in the system such as the inverter 231/driving motor 232 in parallel via the main bus terminal 211 and the bidirectional high voltage DC/DC power converter 221 connected to a high voltage battery terminal may be connected to the main bus terminal 211 which is an output side of the fuel cell stack 10, to control an output of the fuel cell stack 10 and the output of the high voltage battery 220 by adjusting the voltage (e.g., output voltage to the main bust terminal) from the bidirectional high voltage DC/DC power converter 221.

An output terminal of the fuel cell stack 10 may be connected to a diode 213 to prevent a reverse current from flowing. A relay 214 provided to selectively connect the fuel cell stack 10 to the main bus terminal 211 may also be installed. The relay 214 may remain in a connected state while a vehicle in which the fuel cell stack 10 is operated is driven and when the fuel cell system is in an idle stop/restart-up state and is in a disconnection state during key off (e.g., normal shut-down based on the key off) or emergency shut-down. The fuel cell load apparatus 20 illustrated in FIG. 1 may include the high voltage battery 220, the high voltage load 233, the driving motor 232, and the like which are illustrated in FIG. 2.

Figure 4:
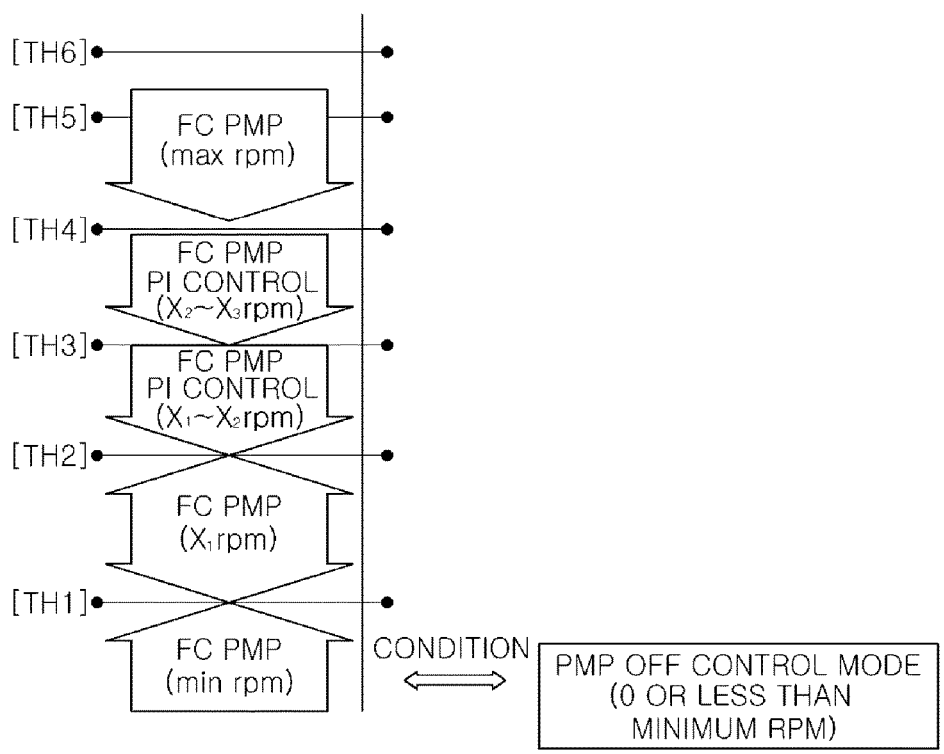
FIG. 4 is an exemplary diagram illustrating an operation standard of a cooling pump in a method for adjusting a temperature of a fuel cell stack according to an exemplary embodiment of the present invention.
Figure 5:
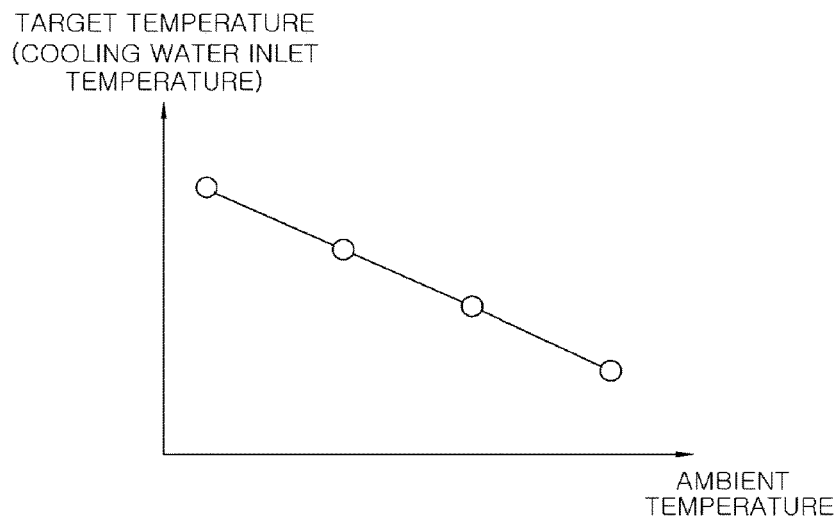
FIG. 5 is an exemplary graph illustrating a correlation between an ambient temperature and a target cooling water inlet temperature in the fuel cell stack according to an exemplary embodiment of the present invention.

FIG. 4 is an exemplary diagram illustrating an operation standard of a cooling pump in a method for adjusting a temperature of a fuel cell stack according to an exemplary embodiment of the present invention and FIG. 5 is an exemplary graph illustrating a correlation between an ambient temperature and a target cooling water inlet temperature in the fuel cell stack.

FIG. 4 illustrates sections TH1<TH2<TH3<TH4<TH5<TH6 for each step which is previously set for a cooling water outlet temperature of the fuel cell stack 10. First, the method for adjusting a temperature of a fuel cell stack 10 may include turning off, by a controller, the cooling water pump 70 or operating (e.g., perform a pump OFF mode) the cooling water pump 70 while reducing a rotation speed of the cooling water pump 70 to be less than a preset reference rotation speed (e.g., preset base rpm), when the cooling water temperature at the cooling water outlet side is equal to or less than a first temperature Ti.

As illustrated in FIG. 4, the rpm of the cooling water pump configured to supply cooling water to the fuel cell stack 10 may be adjusted differently based on to what section the cooling water temperature at the cooling water outlet side of the fuel cell stack 10 belongs, based on the preset temperature sections for each step.

Although not illustrated in FIG. 4, when the heating value of the fuel cell stack 10 is equal to or less than a first reference heating value, the controller may also be configured to turn off the cooling water pump 70 or operate (e.g., perform the pump OFF mode) the cooling water pump 70 while reducing the rotation speed of the cooling water pump 70 to the preset reference rotation speed and when the air outlet temperature of the fuel cell stack is less than a preset first air outlet temperature, the controller may also be configured to turn off the cooling water pump 70 or operate the cooling water pump while reducing the rotation speed of the cooling water pump 70 to the preset reference rotation speed.

Further, when a torque value required in the motor connected to the fuel cell stack is less than a first required torque and is maintained for a first period of time, the controller may be configured to turn off the cooling water pump 70 or operate (e.g., perform the pump Off mode) the cooling water pump 70 while reducing a rotation speed of the cooling water pump 70 to be less than the preset reference rotation speed. In response to determining that the greater value of a cooling water temperature estimation value at the cooling water outlet side of the fuel cell stack and the cooling water temperature at the cooling water outlet side detected by the temperature sensor exceeds a second temperature by turning off the cooling water pump 70 or operating the cooling water pump 70 while reducing the rotation speed of the cooling water pump 70 to be less than a lowest rotation speed, the controller may be configured to normally operate (e.g., perform a pump normal mode) the cooling pump 70. The cooling water temperature estimation value may be obtained by the method disclosed in Korean Patent Laid-Open Publication No. 2011-0138443.

Additionally, when the heating value of the fuel cell stack 10 exceeds a preset second reference heating value, when the air outlet temperature of the fuel cell stack 10 exceeds a second air outlet temperature, or when the torque value required in the motor connected to the fuel cell stack 10 exceeds a preset second required torque, the controller may be configured to normally operate (perform the pump normal mode) the cooling water pump 70. Even when the greater value of the cooling water temperature estimation value at the cooling water outlet side of the fuel cell stack 10 and the cooling water temperature at the cooling water outlet side detected by the temperature sensor is equal to or greater than the preset second temperature, the controller may be configured to normally operate the cooling water pump 70. In particular, the preset first temperature and the preset second temperature may be preset to be equal to or less than the target cooling water temperature at the cooling water inlet side. Further, the preset second temperature may be preset to be greater than the preset first temperature and the preset second reference heating value may be preset to be greater than the preset first reference heating value.

Furthermore, when the pump OFF mode is performed, an output limit value of the fuel cell stack may be set based on the cooling water temperature estimation value at the cooling water outlet side. When the pump OFF mode is performed, the output limit value of the fuel cell stack may be set based on the non-circulation of the cooling water. For example, when the pump OFF mode is performed, the output limit value of the fuel cell stack may be set to be about 30%. When the pump OFF mode is performed, the cooling water may not be circulated (e.g., may be prevented or stopped from being circulated) and therefore the current limit value during the non-circulation of the cooling water may not be required to be set. For reference, an initial value of the temperature estimation value may be set to be a temperature sensor value of the cooling water outlet before the pump OFF mode is performed. In other words, the initial value of the temperature estimation value may be initialized to the temperature sensor value each time before the pump OFF mode is performed.

When the cooling water pump 70 is turned off, an rpm command value to the cooling water pump 70 may become 0 and when the cooling water pump 70 is operated while reducing the cooling water pump 70 to be less than a minimum rotation speed, the rpm command value may be less than min_rpm (e.g., about 1500 rpm) which may be a lowest rpm.

Figure 6:
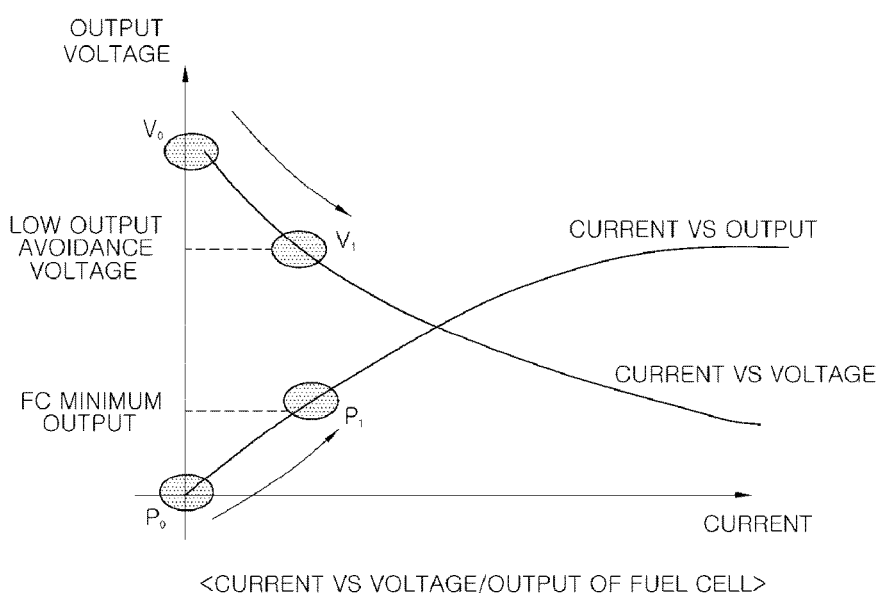
FIG. 6 is an exemplary graph illustrating a relationship between an output current and a voltage or an output of the fuel cell stack for describing the method for adjusting a temperature of a fuel cell stack according to the exemplary embodiment of the present invention.

FIG. 6 is an exemplary graph illustrating a relationship between an output current and a voltage or an output of the fuel cell stack for describing the method for adjusting a temperature of a fuel cell stack according to the exemplary embodiment of the present invention. In particular, FIG. 6 is an exemplary diagram illustrating a method for increasing a fuel cell stack by charging the high voltage battery 220 among the methods for adjusting a temperature of a fuel cell stack according to the exemplary embodiment of the present invention.

In other words, the method for increasing a fuel cell stack by charging the high voltage battery 220 may avoid a low output of the fuel cell stack. As a result, when the cooling water temperature estimation value at the cooling water outlet of the fuel cell stack or the cooling water temperature (e.g., cooling water temperature calculation value) detected by the temperature sensor while the output normal mode is performed is equal to or less than a third temperature (hereinafter, condition 1), the power converter 221 which connects the output terminal of the fuel cell stack with the high voltage battery 220 may be configured to reduce (e.g., perform a low output avoidance mode) a voltage upper bound of the bus terminal between the output terminal of the fuel cell stack and the power converter. Further, under the condition 1, the power converter 221 may be configured to increase a charging current limit value of the power converter 221 and increase a target state of charge (SOC).

On the other hand, when the cooling water temperature estimation value at the cooling water outlet of the fuel cell stack or the cooling water temperature (e.g., cooling water temperature calculation value) detected by the temperature sensor is equal to or greater than a fourth temperature (hereinafter, condition 2), the power converter 221 may be configured to recover (e.g., perform the output normal mode) the reduced voltage upper bound to an original value. Further, when satisfying the condition 2, the power converter 221 may be configured to recover (e.g., increasing release) the previously increased charging current limit value and target state of charge to an original value. Particularly, the preset third temperature and the preset fourth temperature may be present to be equal to or less than the target cooling water temperature at the cooling water inlet and the preset fourth temperature may be preset to be greater than the preset third temperature. The preset fourth temperature may be less than the preset first temperature.

The charging limit value and the target state of charge may be adjusted by reducing and recovering the voltage upper bound. Further, the reduction in the voltage upper bound of the power converter 221 may not be performed when the charging output which is output from the fuel cell stack exceeds an allowable charging output of the high voltage battery 220 or when the state of charge of the high voltage battery 220 exceeds the allowable state of charge. The reduction in the voltage upper bound of the power converter 221 may not be performed in a fuel cell stop (FC stop) state or a regenerative braking state.

When the cooling water temperature is equal to or less than the first temperature, even though the cooling water pump 70 is turned off or the cooling water pump 70 is operated while reducing the rotation speed of the cooling water pump 70 to be less than the preset reference rotation speed, when the cooling water temperature estimation value at the cooling water outlet of the fuel cell stack or the cooling water temperature (which is different when the pump OFF mode is being performed or when the pump normal mode is being performed) at the cooling water outlet detected by the temperature sensor is equal to or less than the third temperature which is preset to be less than the preset first temperature, the power converter may be configured to reduce the voltage upper bound of the bus terminal to charge the output of the fuel cell stack in the high voltage battery 220 and increase the temperature of the fuel cell stack. In other words, as the temperature of the fuel cell stack is gradually reduced, the reduction in temperature may be prevented by performing the pump OFF mode and when the temperature is further reduced, the temperature of the fuel cell stack may be increased by charging the battery.

Moreover, when the heating value of the fuel cell stack is equal to or less than the preset first reference heating value, when the cooling pump 70 is turned off or is operated while reducing the rotation speed of the cooling water pump 70 to be less than the preset reference rotation speed and then when the heating value of the fuel cell stack exceeds the preset second reference heating value, the cooling pump 70 may be normally operated (e.g., performed in the pump normal mode). In particular, while the output normal mode in which the voltage upper bound of the bus terminal between the output terminal of the fuel cell stack and the power converter has a predetermined value, when the cooling water temperature at the cooling water outlet side detected by the temperature sensor, the power converter may be configured to perform the low output avoidance mode which reduces the voltage upper bound of the bus terminal and thus may not perform the pump normal mode when the heating value of the fuel cell stack exceeds the preset second reference heating value. In other words, the voltage upper bound of the power converter 221 may be reduced to prevent the cooling water pump 70 from being normally operated even though the output of the fuel cell stack is generated to increase the heating value.

According to the method for controlling a temperature of a fuel cell stack in accordance with the exemplary embodiment of the present invention, it may be possible to maintain the temperature of the fuel cell stack within a normal range by turning on or off the cooling pump based on the cooling water temperature at the cooling water outlet and thus prevent the flooding and dry-out phenomena of the fuel cell stack. Further, when there is a need to increase the temperature of the fuel cell stack, it may be possible to increase the temperature of the fuel cell stack by charging the battery.

Although the present invention has been described with reference to exemplary embodiments shown in the accompanying drawings, it is only an example. It will be understood by those skilled in the art that various modifications and equivalent other exemplary embodiments are possible from the present invention. Accordingly, an actual technical protection scope of the present invention is to be defined by the following claims.

What is claimed is:

1. A method for controlling a temperature of a fuel cell stack, comprising:
    performing a pump OFF mode which turns off the cooling water pump or operates the cooling water pump while reducing the rotation speed of the cooling water pump to be less than the reference rotation speed, when a cooling water outlet temperature is equal to or less than a preset first temperature while a pump normal mode which adjusts a rotation speed of a cooling water pump to be equal to or greater than a preset reference rotation speed and varies revolutions per minute (rpm) based on the cooling water outlet temperature is performed;
    performing the pump normal mode when a cooling water outlet temperature estimation value exceeds a preset second temperature while the pump OFF mode is performed; and
    performing a low output avoidance mode which allows a power converter to reduce a voltage upper bound of a bus terminal, when a cooling water outlet temperature calculation value is equal to or less than a preset third temperature while an output normal mode in which the voltage upper bound of the bus terminal between an output terminal of the fuel cell stack and the power converter has a predetermined value is performed, wherein the cooling water outlet temperature calculation value is a cooling water outlet temperature estimation value in the pump OFF mode and is a sensing value of the cooling water outlet temperature in the pump normal mode, and wherein the first temperature is equal to or greater than the third temperature.

2. The method of claim 1, wherein the pump OFF mode is performed when the cooling water outlet temperature is equal to or less than the preset first temperature and a heating value of the fuel cell stack is equal to or less than a preset first reference heating value, and the pump normal mode is performed when the cooling water outlet temperature estimation value exceeds the preset second temperature or the heating value of the fuel cell stack exceeds a preset second reference heating value.

3. The method of claim 1, wherein the pump OFF mode is performed when the cooling water outlet temperature is equal to or less than the preset first temperature and an air outlet temperature of the fuel cell stack is less than a first air outlet temperature, and the pump normal mode is performed when the cooling water outlet temperature estimation value exceeds the preset second temperature or the air outlet temperature of the fuel cell stack exceeds a preset second air outlet temperature.

4. The method of claim 1, wherein the pump OFF mode is performed when the cooling water outlet temperature is equal to or less than the preset first temperature and a torque value required in a motor connected to the fuel cell stack is less than a preset first required torque, and the pump normal mode is performed when the cooling water outlet temperature estimation value exceeds the preset second temperature or the torque value required in a motor connected to the fuel cell stack exceeds a preset second required torque.

5. The method of claim 1, wherein the pump normal mode is performed when a largest value of the cooling water outlet temperature estimation value of the fuel cell stack and the cooling water outlet temperature detected by a temperature sensor exceeds the preset second temperature.

6. The method of claim 1, wherein the preset first temperature and the preset second temperature are equal to or less than a target cooling water temperature at a cooling water inlet side.

7. The method of claim 1, wherein the output limit value of the fuel cell stack is set using the cooling water outlet temperature estimation value.

8. The method of claim 1, wherein the output limit value of the fuel cell stack is set based on a non-circulation of cooling water.

9. The method of claim 1, wherein the cooling water outlet temperature estimation value of the fuel cell stack is initialized to the detected cooling water temperature just before the pump OFF mode is performed.

10. A method for controlling a temperature of a fuel cell stack, comprising:
    performing a low output avoidance mode to allow a power converter to reduce a voltage upper bound of a bus terminal, when a cooling water outlet temperature is equal to or less than a preset third temperature while an output normal mode in which the voltage upper bound of the bus terminal between an output terminal of the fuel cell stack and the power converter has a predetermined value is performed; and
    performing the output normal mode when the cooling water outlet temperature is equal to or greater than a preset fourth temperature while the low output avoidance mode is performed, wherein the cooling water outlet temperature is a cooling water outlet temperature estimation value in a pump OFF mode which turns off a cooling water pump or operates the cooling water pump while reducing a rotation speed of the cooling water pump to be less than a preset reference rotation speed and is a sensing value of the cooling water outlet temperature in a pump normal mode which adjusts the rotation speed of the cooling water pump to be equal to or greater than the preset reference rotation speed and varies a revolutions per minute (rpm) based on the cooling water outlet temperature.

11. The method of claim 10, wherein the preset third temperature and the preset fourth temperature are equal to or less than a target cooling water temperature at a cooling water inlet side.

12. The method of claim 10, wherein in the low output avoidance mode, a charging current limit value of the power converter or a target state of charge (SOC) of the high voltage battery are increased, and in the output normal mode, the increase in the charging current limit value of the power converter or the target state of charge of the high voltage battery is released.

13. The method of claim 12, wherein the reduction in the voltage upper bound of the bus terminal and the increase in the charging current limit value are performed within a range of an allowable charging output or an allowable state of charge of the high voltage battery.

14. The method of claim 10, wherein the low output avoidance mode is not performed when power generation of the fuel cell stack stops.

15. The method of claim 10, wherein the low output avoidance mode is not performed in a regenerative braking state.

16. A method for controlling a temperature of a fuel cell stack, comprising:
performing a pump OFF mode which turns off the cooling water pump or operates the cooling water pump while reducing the rotation speed of the cooling water pump to be less than the reference rotation speed, when a cooling water outlet temperature is equal to or less than a preset first temperature while a pump normal mode which adjusts a rotation speed of a cooling water pump to be equal to or greater than a preset reference rotation speed and varies revolutions per minute (rpm) based on the cooling water outlet temperature is performed; and performing a low output avoidance mode which allows a power converter to reduce a voltage upper bound of a bus terminal, when a cooling water outlet temperature calculation value is equal to or less than a preset third temperature while an output normal mode in which the voltage upper bound of the bus terminal between an output terminal of the fuel cell stack and the power converter has a predetermined value is performed, wherein the cooling water outlet temperature calculation value is a cooling water outlet temperature estimation value in the pump OFF mode and is a sensing value of the cooling water outlet temperature in the pump normal mode, and wherein the first temperature is equal to or greater than the third temperature.

17. A method for controlling a temperature of a fuel cell stack, comprising:
performing a pump OFF mode which turns off a cooling water pump or operates the cooling water pump while reducing a rotation speed of the cooling water pump to be less than a preset reference rotation speed, when a cooling water outlet temperature is equal to or less than a preset first temperature and a heating value of the fuel cell stack is equal to or less than a preset first reference heating value while a pump normal mode which adjusts a rotation speed of the cooling water pump to be equal to or greater than a preset reference rotation speed and varies revolutions per minute (rpm) based on the cooling water outlet temperature is performed; and performing a low output avoidance mode which allows a power converter to reduce a voltage upper bound of a bus terminal, when a cooling water outlet temperature calculation value is equal to or less than a preset third temperature while an output normal mode in which the voltage upper bound of the bus terminal between an output terminal of the fuel cell stack and the power converter has a predetermined value is performed, wherein the first reference heating value is equal to or greater than a heating value of the fuel cell stack in the low output avoidance mode and the cooling water outlet temperature calculation value is a cooling water outlet temperature estimation value in the pump OFF mode and a sensing value of the cooling water outlet temperature in the pump normal mode.

* * * * *